US012611632B2

(12) United States Patent
Heinz et al.

(10) Patent No.: US 12,611,632 B2
(45) Date of Patent: Apr. 28, 2026

(54) HUMIDIFIER

(71) Applicant: Joma-Polytec GmbH, Bodelshausen (DE)

(72) Inventors: Stefan Heinz, Bodelshausen (DE); Oliver Vollmer, Rottenburg (DE)

(73) Assignee: Joma-Polytec GmbH, Bodelshausen (DE)

(*) Notice: Subject to any disclaimer, the term of this patent is extended or adjusted under 35 U.S.C. 154(b) by 44 days.

(21) Appl. No.: 18/553,285

(22) PCT Filed: Dec. 14, 2022

(86) PCT No.: PCT/EP2022/085942
§ 371 (c)(1),
(2) Date: Sep. 29, 2023

(87) PCT Pub. No.: WO2023/111073
PCT Pub. Date: Jun. 22, 2023

(65) Prior Publication Data
US 2024/0181396 A1 Jun. 6, 2024

(30) Foreign Application Priority Data

Dec. 16, 2021 (DE) ..................... 10 2021 133 474.8

(51) Int. Cl.
*B01D 63/02* (2006.01)
*H01M 8/04119* (2016.01)

(52) U.S. Cl.
CPC ........ *B01D 63/02* (2013.01); *H01M 8/04149* (2013.01); *B01D 2313/19* (2013.01); *B01D 2313/201* (2022.08); *B01D 2315/22* (2022.08)

(58) Field of Classification Search
CPC ................ B01D 63/02; B01D 2313/19; B01D 2313/201; B01D 2315/22; H01M 8/04149
(Continued)

(56) References Cited

U.S. PATENT DOCUMENTS

| | | | | |
|---|---|---|---|---|
| 4,381,267 A | * | 4/1983 | Jackson | B01D 63/031 |
| | | | | 261/DIG. 65 |
| 6,669,177 B2 | * | 12/2003 | Shimanuki | B01D 63/034 |
| | | | | 261/96 |

(Continued)

FOREIGN PATENT DOCUMENTS

| | | |
|---|---|---|
| DE | 10 2014 104 960 A1 | 10/2014 |
| DE | 10 2016 004850 A1 | 10/2017 |

*Primary Examiner* — Charles S Bushey
(74) *Attorney, Agent, or Firm* — ASLAN LAW, P.C.

(57) ABSTRACT

A humidifier having a housing that extends along an axial direction, the housing having a first inlet, a first outlet, a second inlet and a second outlet, and a membrane unit being arranged in the interior of the housing. The first inlet and the first outlet are in flow connection with each other by means of a first flow path, and the second inlet and the second outlet are in flow connection with each other by a second flow path. The membrane unit is cylindrical and has a plurality of hollow fiber membranes arranged side by side. The membrane unit is outwardly surrounded at least in part by a first chamber, and the first chamber is outwardly surrounded at least in part by a second chamber separate from the first chamber. The first chamber and the second chamber are in flow connection with each other via one or more throttle slots.

15 Claims, 4 Drawing Sheets

(58) Field of Classification Search
USPC ........................................................ 261/104
See application file for complete search history.

(56)                    References Cited

U.S. PATENT DOCUMENTS

| | | | | |
|---|---|---|---|---|
| 7,264,233 B2 * | 9/2007 | Katagiri | ............ | H01M 8/04149 |
| | | | | 429/444 |
| 8,100,385 B2 * | 1/2012 | Nagumo | ................ | B01D 63/02 |
| | | | | 261/104 |
| 2006/0147774 A1 * | 7/2006 | Suzuki | .............. | H01M 8/04164 |
| | | | | 429/513 |
| 2007/0246847 A1 * | 10/2007 | Bitoh | ................ | H01M 8/04126 |
| | | | | 261/104 |
| 2008/0237902 A1 | 10/2008 | Nagumo et al. | | |
| 2012/0282533 A1 | 11/2012 | Kim et al. | | |
| 2014/0306359 A1 | 10/2014 | Martz | | |
| 2020/0058948 A1 * | 2/2020 | Kim | .................. | H01M 8/04835 |

* cited by examiner

Section IV – IV:

HUMIDIFIER

CROSS-REFERENCE TO RELATED APPLICATIONS

This application claims priority to DE Patent Application No. 10 2021 133 474.8 filed on Dec. 16, 2021, and this application claims priority to and is a 371 of international PCT Application No. PCT/EP2022/085942 filed on Dec. 14, 2022, the entire contents of which are hereby incorporated by reference.

The invention relates to a humidifier having features of the claimed invention.

Humidifiers of the type mentioned at the outset are known from the prior art, for example from DE 10 2014 104 960 A1. The fuel cell humidifier described therein has a folded diffusion medium which separates a first flow region (wet side) and a second flow region (dry side) from one another. As a result, water can be guided from a first gas (wet side) to a second gas (dry side), thereby increasing the relative humidity of the second gas. However, the production of the folded diffusion medium is comparatively complicated. In addition, this construction leads to a comparatively large space requirement in addition to fluidic problems due to multiple deflection of the gas flows which can lead to a corresponding pressure loss.

US 2008/0237902 A1 discloses a humidifier, which operates according to the countercurrent principle.

The object of the invention is to provide a humidifier with simple structural means which has a comparatively compact structure and is advantageous in terms of flow.

The invention achieves this object by means of a humidifier having the features of the claimed invention.

The humidifier is a humidifier for humidifying a gas flow. The humidifier is thus able to transfer moisture or water from a (comparatively moist) gas flow (second flow path) to a (comparatively dry) gas flow (first flow path). In a specific embodiment, the humidifier can optionally be designed as a humidifier for a fuel cell (fuel cell humidifier).

The humidifier has a housing extending along an axial direction with a first inlet, a first outlet, a second inlet and a second outlet. A membrane unit is arranged in the interior of the housing. The first inlet and the first outlet are in flow connection with each other by means of a first flow path (gas to be humidified or gas flow to be humidified).

The second inlet and the second outlet are in flow connection with each other by means of a second flow path (gas to be dehumidified gas or gas flow to be dehumidified). The membrane unit is cylindrical and has a plurality of hollow fiber membranes arranged side by side. The membrane unit is (radially) outwardly surrounded at least in part by a first chamber. The first chamber is, in turn, (radially) outwardly surrounded at least in part by a second chamber which is separate from the first chamber. The first chamber and the second chamber are in flow connection with each other via one or more throttle slots.

As a result of the proposed embodiment, improved flow through the membrane unit by means of the second flow path can be achieved, so that moist air (gas to be dehumidified or gas flow to be dehumidified, for example moist air from the stack of a fuel cell) passes as uniformly as possible over the hollow fibers. For this purpose, two chambers are arranged on the outside of the membrane unit, which chambers are connected to one another by one or more throttle slots. The first (inner) chamber (inner exhaust duct) forms a uniform resistance around the membrane unit due to the throttle slot(s). This results in a very uniform flow, circulating from the center to the outside. After the throttle slot(s), the air flows into the second (outer) chamber (outer exhaust duct) which acts as an air collector and guides the exhaust air to the second outlet.

The first inlet and the first outlet are in flow connection with each other by means of the first flow path (first flow connection). The first flow path extends from the first inlet along or parallel to the axial direction through the membrane unit and to the first outlet. In other words, the gas flow to be humidified (for example dry, oxygen-containing or oxygen-rich fresh air) passes the membrane unit along or parallel to the axial direction. The gas flow (humidified by passing the membrane unit) leaves the humidifier at the first outlet (humidified fresh air). This gas flow can then be supplied, for example, to a stack of a fuel cell.

The second inlet and the second outlet are in flow connection with each other by means of the second flow path (second flow connection). The second flow path extends from the second inlet through the membrane unit and to the second outlet, wherein the second flow path passes into the interior of the membrane unit, in particular by means of a tubular body that will be described later, and runs from there (radially) outwards to the first chamber and to the second chamber to the second outlet. In other words, the gas flow to be dehumidified (for example moist, low-oxygen air) passes the membrane unit to a certain extent along or parallel to the axial direction, wherein the gas flow within the membrane unit then flows (radially) outwards (via the first chamber and the second chamber) to the second outlet. The gas flow (dehumidified by passing the membrane unit) leaves the humidifier at the second outlet (dehumidified or spent air). The moist, low-oxygen air at the second inlet can be supplied, for example, as spent air from a stack of a fuel cell. The dehumidified air at the second outlet can be supplied to a compressor, for example.

Furthermore according to the invention, the membrane unit has a section with a membrane potting at its axial ends (aligned along the axial direction). The interspaces between the hollow fiber membranes are closed in the section with membrane potting, so that there a gas or a moist gas flow can only flow axially through the hollow fiber membranes themselves. A flow through interspaces (not present there) between the hollow fiber membranes is not possible in the sections with membrane potting.

The hollow fiber membranes are arranged side by side between the sections with membrane potting, wherein the central longitudinal axis of the hollow fiber membrane can be arranged in particular parallel to the axial direction of the housing in each case. The interspaces between the hollow fiber membranes are preferably free so that a gas or a moist gas flow flows past the hollow fiber membranes and can, for example, pass (radially) outwardly to the second outlet.

The wall of the hollow fiber membrane is passable for water vapor, which thus passes through the wall of the hollow fiber membrane into the interior of the hollow fiber membrane. In this way, water vapor or moisture is transferred from the second flow path or from the second gas flow (from outside the hollow fiber membrane) to the first flow path or the first gas flow (into the interior of the hollow fiber membrane). This increases the relative humidity of the first gas flow.

The membrane unit can have an enclosure or an outer casing, for example made of plastic, which surrounds the membrane unit (radially) outwardly. In the region of the hollow fiber membrane (axially between the sections with membrane potting), the enclosure has a plurality of openings through which gas or a moist gas flow can pass from the interior of the membrane unit into the first chamber. The openings extend in particular uniformly over the circumference of the cylindrical enclosure. The openings can be designed as elongate slots or as individual passages, for example bores.

The enclosure extends axially preferably over the sections with membrane potting and the section lying in between with (free) hollow fiber membranes. The enclosure holds the components of the membrane unit together and can have a fixation engaging in the sections with membrane potting.

The enclosure can have a sealing section in the region of the sections with membrane potting which is preferably circumferential along the circumferential direction for sealing the membrane unit relative to the housing. The sealing section can have a groove, which is preferably also circumferential along the circumferential direction, for receiving an elastic sealing element, in particular an O-ring. The membrane unit can be designed in particular as a cartridge unit.

The first chamber and the second chamber can be separated from one another by a wall extending in particular parallel to the axial direction. Notwithstanding the above, the second (outer) chamber is in flow connection in particular with the second outlet.

Further according to the invention, the first (inner) chamber has a greater length along the axial direction than the second (outer) chamber. The first (inner) chamber can have a lower height along a radial direction, which is oriented orthogonally to the axial direction, than the second (outer) chamber. These measures favor the formation of a uniform resistance around the membrane unit. This contributes to a balanced and high transmission of moisture from the second flow path or second gas flow to the first flow path or first gas flow.

Specifically, the first chamber extends along the membrane unit from the section with membrane potting at the first end to the section with membrane potting at the second end. In other words, the first chamber can extend axially at least along the unpotted section of the membrane unit (section between membrane potting at the first end and membrane potting at the second end). The second chamber can extend along the axial direction only over part of the first chamber, for example at least predominantly or completely in a housing section, for example a second housing half.

Advantageously, the first (inner) chamber and/or the second (outer) chamber can be formed at least predominantly circumferentially along the circumferential direction of the membrane unit (designed to be at least 50% circumferential along the circumferential direction), preferably formed completely circumferentially along the circumferential direction of the membrane unit. This contributes to high efficiency of the membrane unit. Specifically, the first chamber and/or the second chamber can each be designed as an annular space.

A water outlet (outlet air of membrane unit), which is in flow connection with the second (outer) chamber, can be expediently formed on the housing, in particular downward along the direction of gravity. Excess moisture or excess water can thus be collected and discharged from the humidifier or its housing.

Within the scope of a preferred embodiment, the throttle slot(s) can be designed to be at least predominantly (at least over 50% along the circumferential direction), preferably completely, circumferential along the circumferential direction. This contributes to comparatively homogeneous flow conditions around the membrane unit. Specifically, the throttle slot can be designed to be continuous along the circumferential direction. It is also conceivable that the throttle slot be formed as multiple slots spaced apart from one another along the circumferential direction and having web sections remaining therebetween (similar to a dashed line). Alternatively or additionally, the throttle slot(s) can have a slot width (dimension of the throttle slot(s) along or parallel to the axial direction) of different size along the circumferential direction. In this way, adjustment with regard to the most uniform possible flow can be created depending on the prevailing flow conditions and/or gravity influences.

Advantageously, the second inlet can be in flow connection with a tubular body which extends along or parallel to the axial direction, in particular centrally, through the membrane unit, wherein the tubular body has (at least in the region in which it overlaps axially with the hollow fiber membranes, i.e., between the sections with membrane potting) a plurality of passages in its tube wall (on the lateral side), wherein a throttle disk is arranged in the tubular body, at which throttle disk the clear inner cross section of the tubular body is reduced by at least 30%, preferably by at least 40%, more preferably by at least 50%. The passages in the tube wall enable the passage of gas or moist gas flow from the interior of the tubular body into the interspace between the hollow fiber membranes. The integrated throttle disk (air mass flow throttle) ensures that most of the inflowing air mass flow does not first accumulate at the end of the tubular body facing away from the second inlet, but rather that a large portion of the gas flow or air passes outwards and into the inner chamber (inner exhaust duct) already at the end of the tubular body facing the second inlet on the opposite side of the inflow side into the cartridge. This contributes to high efficiency due to a uniformly distributed flow along the axial direction.

Expediently, the throttle disk can be arranged along the axial direction starting from the second inlet along the axial direction even before the axial center (center along the axial direction) of the membrane unit. In other words, the throttle disk is not arranged centrally in the membrane unit along the axial direction, but, starting from the center, is offset slightly towards the second inlet. This promotes a flow through the membrane unit at the end facing the second inlet.

In the context of a preferred embodiment, the end of the tubular body facing away from the second inlet can be closed by an end wall, wherein an opening is formed in the end wall, which opening is in flow connection with a further water outlet (supply air of membrane unit). The end wall can be arranged in particular along the axial direction within the section with membrane potting facing away from the second inlet. Since entrained water coming, for example, from the stack of a fuel cell reduces efficiency because it precipitates at the membrane surface and thus prevents the exchange of water vapor in this region, an opening, for example a bore, is integrated on the opposite side of the air entry (second inlet) of moist air from the stack, at the end of which opening the water can leave the humidifier. This already separated water no longer has to be separated by a separate water separator downstream of the humidifier, for example in order to avoid damage to a possibly present turbine. Thus, a water separator can be dimensioned smaller or may be omitted.

Specifically, the humidifier can be configured such as to operate according to the cross-flow principle. This means that the first flow path and the second flow path (coming from the respective inlet) are combined, intersect and are then guided away from one another again. This differs, for example, from humidifiers operating according to the countercurrent principle, in which flow paths flow congruently or parallel to one another in opposite directions or are guided along one another.

Advantageously, the first inlet and the second inlet can be arranged in a first section of the housing, and the first outlet and the second outlet can be arranged in a second (further) section of the housing. Advantageous throughflow characteristics of the humidifier can thus be achieved, in particular in the form of a so-called cross-flow principle.

The housing can be composed of multiple housing parts, wherein the housing parts in the assembled state each rest against a parting plane. Specifically, the housing parts can be designed in the form of two housing parts which rest against one another at a parting plane, in particular in the form of two housing halves. A flange connection can be formed at the parting plane, i.e., each housing part or each housing half can have a corresponding flange section at the parting plane.

The housing can be designed as a metal housing or as a plastic housing. Notwithstanding the above, stiffening ribs can be provided on the outer side of the housing.

The invention is explained in more detail below with reference to the figures, wherein identical or functionally identical elements are provided with identical reference signs, but, where applicable, only once. In the drawings.

Figures 1A, 1B:
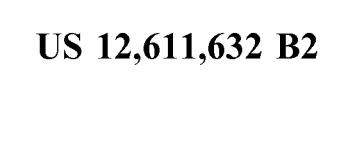
FIG. 1 shows an embodiment of the humidifier with a view of the inlets (FIG. 1*a*) and of the outlets (FIG. 1*b*), in a perspective view in each case.

FIGS. 1*a* and 1*b* show a humidifier which is denoted overall by reference sign 10. The humidifier 10 can be configured and/or intended as a humidifier 10 for a fuel cell, for example.

The humidifier 10 has a housing 14 extending along an axial direction 12. The housing 14 has a first inlet 16, a first outlet 18, a second inlet 20 and a second outlet 22.

In the example, the housing 14 has two housing halves 24, 26 which rest against one another at a parting plane 28. The housing halves 24, 26 each have a flange section 30, 32 at the parting plane 28 so that the housing halves 24, 26 can be connected to one another in the example by means of a flange connection. In the example, there are several screw-in points 34 for this purpose.

In the example, the first inlet 16 and the second inlet 20 are arranged in an end of the housing half 24 facing away from the flange section 30. The first outlet 18 and the second outlet 22 are arranged on the further housing half 26. The first outlet 18 is arranged at the end of the housing half 26 facing away from the flange section 32. The second outlet 22 is arranged adjacent to the flange section 32.

The second inlet 20 and the first outlet 18 are arranged in alignment with the axial direction 12 or with the central longitudinal axis 12 of the housing 14. The first inlet 16 and the second outlet 22 are oriented at an upward angle counter to the direction of gravity g. Notwithstanding the above, stiffening ribs 36, 38 are arranged in each case on the housing half 24 and on the housing half 26.

The further embodiment of the humidifier 10 is described with reference to FIGS. 2 to 4*b*.

Figure 2:
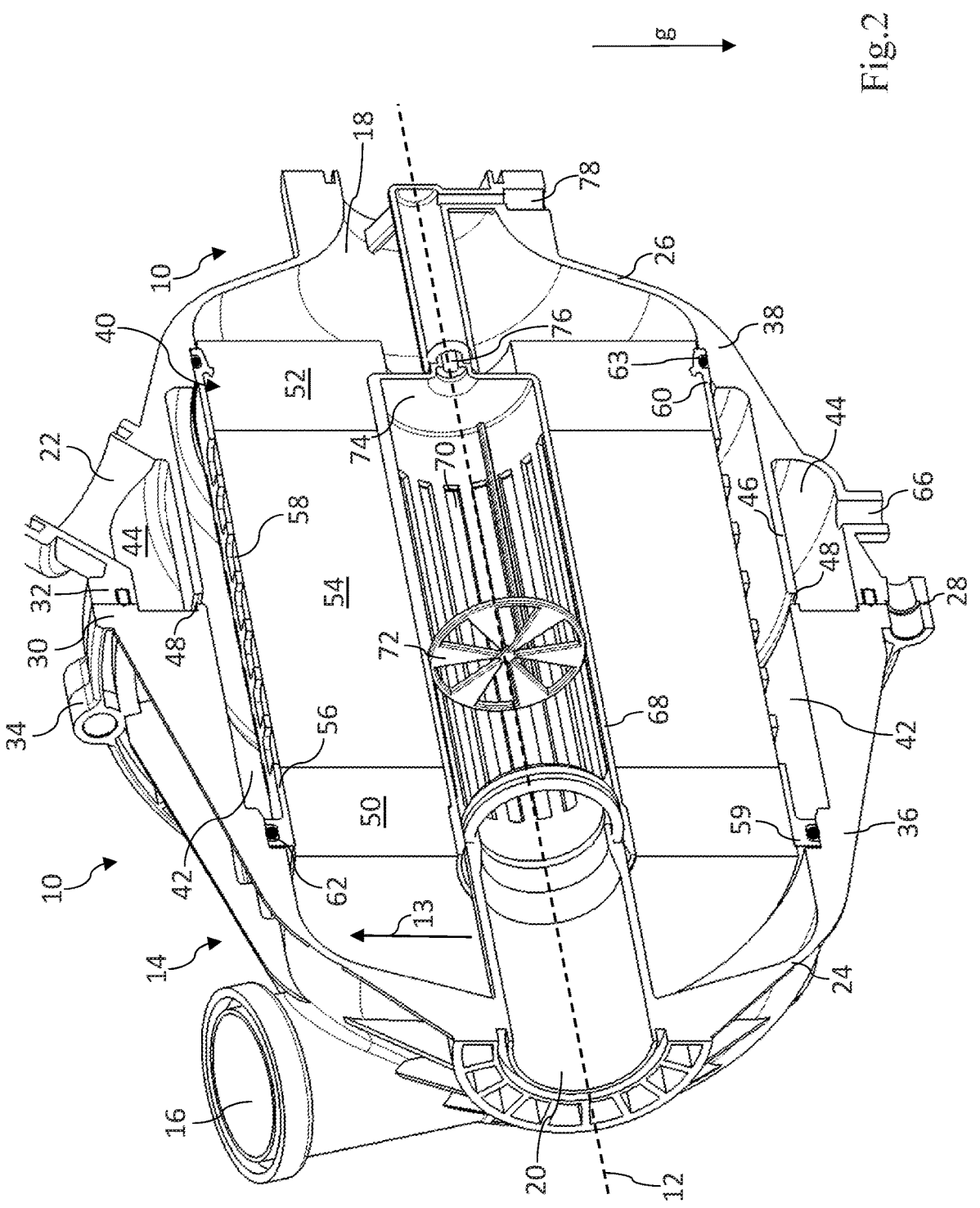
FIG. 2 shows a perspective longitudinal section of the humidifier of FIG. 1.
Figure 3:
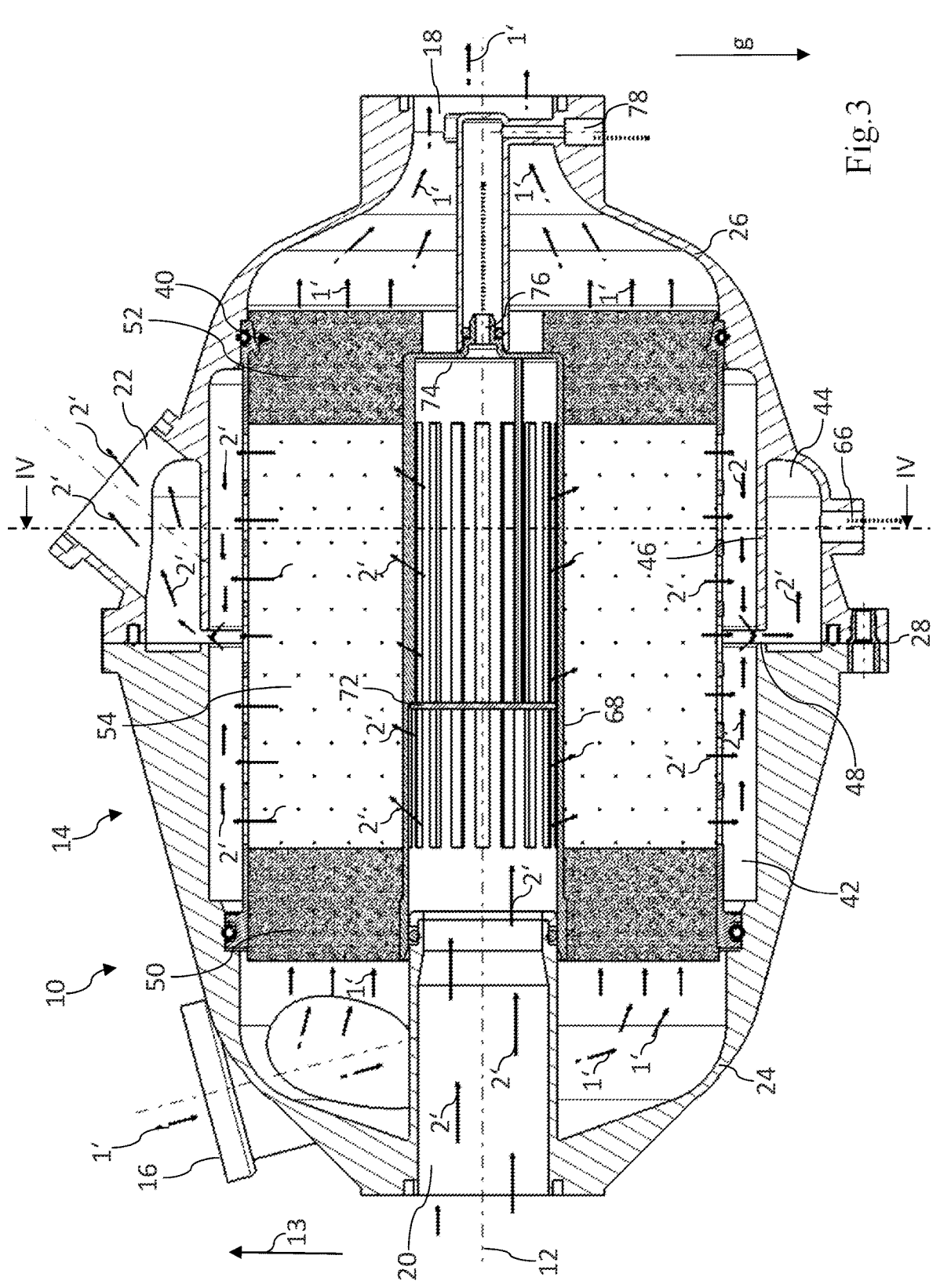
FIG. 3 shows a further longitudinal section of the humidifier of FIG. 1 with illustration of the flows.

A membrane unit 40 is arranged in the interior of the housing 14 (cf. FIGS. 2 and 3). The membrane unit 40 is designed to be cylindrical in the example, in particular in the form of a vertical circular cylinder, and has a plurality of hollow fiber membranes arranged side by side (not shown in detail). The membrane unit 40 is described in more detail further below.

The first inlet 16 and the first outlet 18 are in flow connection with each other by means of a first flow path 1' (flow to be humidified; cf. FIG. 3). The second inlet 20 and the second outlet 22 are in flow connection with each other by means of a second flow path 2' (flow to be dehumidified; cf. FIG. 3).

The membrane unit 40 is radially outwardly surrounded at least by a first (inner) chamber 42 (inner gas flow exhaust duct), wherein the first chamber 42 is designed to be circumferential in the example (cf. FIGS. 2 to 4). The first chamber 42 is, in turn, radially outwardly surrounded by a second (outer) chamber 44 separate from the first chamber 42, wherein the second chamber 44 is designed to be circumferential in the example.

The first chamber 42 and the second chamber 44 are separated from one another by a wall 46 extending parallel to the axial direction 12 in the example, and are in flow connection with each other via a throttle slot 48 (cf. FIGS. 2 and 3). In the example, the throttle slot 48 is formed completely circumferentially along the circumferential direction (not shown). The second chamber 44 is in flow connection with the second outlet 22 (cf. FIGS. 3 and 4*b*).

The membrane unit 40 has a section with membrane potting 50, 52 at its axial ends (oriented along the axial direction 12) in each case (cf. FIGS. 2 and 3). The interspaces between the hollow fiber membranes are closed in the sections with membrane potting 50, 52 so that there a gas or a moist gas flow can only flow axially through the hollow fiber membranes themselves.

The hollow fiber membranes are arranged side by side between the sections with membrane potting 50, 52 (section 54 lying in between), wherein the central longitudinal axis of the hollow fiber membrane is arranged parallel to the axial direction 12 of the housing in each case (not shown). The interspaces between the hollow fiber membranes are free, so that a gas or a moist gas flow flows past the hollow fiber membranes and can, for example, pass (radially) outwardly to the second outlet 22.

Figure 4B:
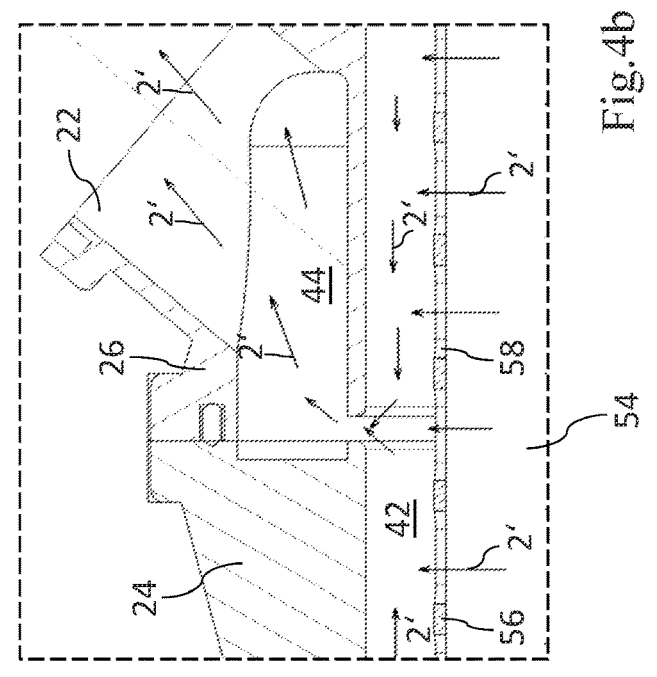
FIG. 4 shows a cross-section of the humidifier of FIG. 1 along a sectional axis IV-IV shown in FIG. 3 (FIG. 4*a*) and an enlarged detail of the longitudinal section of FIG. 3 in the region of the second outlet with illustration of the flow (FIG. 4*b*).

The membrane unit 40 has an enclosure 56 which radially outwardly surrounds the membrane unit 40 (cf. FIGS. 2 and 4*b*). In the region of the hollow fiber membrane between the sections with membrane potting 50, 52 (section 54 lying in between), the enclosure 56 has a plurality of openings 58 through which gas or a moist gas flow can pass from the interior of the membrane unit 40 into the first chamber 42. The enclosure 56 extends axially over the sections with membrane potting 50, 52 and the section 54 lying in between. The enclosure 56 holds the components of the membrane unit 40 together.

The enclosure 56 has a sealing section 59, 60 in the region of the sections with membrane potting 50, 52 which is in each case circumferential along the circumferential direction for sealing the membrane unit 40 relative to the housing 14 (cf. FIGS. 2 and 3). In the example, the sealing section has a groove 62, 63 which is circumferential along the circumferential direction for receiving an elastic sealing element, such as for example an O-ring. In the example, the membrane unit 40 is designed as a cartridge unit.

The first chamber 42 has a greater length along the axial direction 12 than the second chamber 44. The first chamber 42 extends axially along the membrane unit 40 from the section with membrane potting 50 at the first end to the section with membrane potting 52 at the second end. In other words, the first chamber 42 extends axially at least along the unpotted section (section 54 lying in between) of the membrane unit 40. The first chamber 42 extends in both housing halves 24, 26. The second chamber 44 extends almost completely only in the housing half 26. The first chamber 42 has a lower height along a radial direction 13, which is oriented orthogonally to the axial direction 12, than the second chamber 44.

Figure 4A:
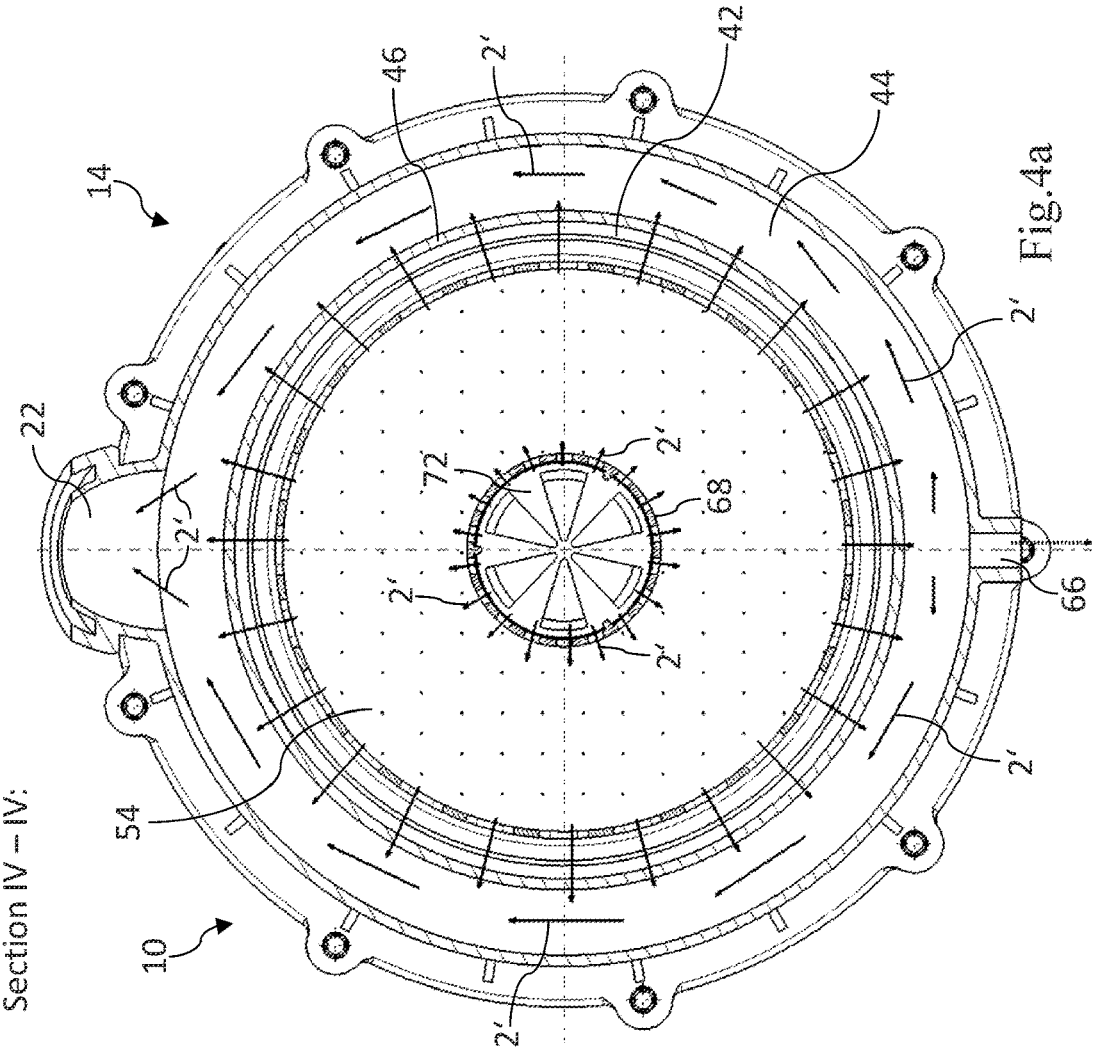

In the example, the first chamber 42 and the second chamber 44 are formed completely circumferentially along the circumferential direction of the membrane unit 40 (cf. FIG. 4a). The first chamber 42 and the second chamber 44 are each designed as an annular space.

A water outlet 66, which is in flow connection with the second chamber 44, is formed on the housing 14 along the direction of gravity g (cf. FIGS. 2 and 3).

In the example, the throttle slot 48 is formed completely circumferentially along the circumferential direction and has a uniform slot width (dimension of the throttle slot 48 along or parallel to the axial direction 12) along the circumferential direction.

The second outlet 20 is in flow connection with a tubular body 68 which extends centrally through the membrane unit 40 along the axial direction 12 (cf. FIGS. 2 and 3). The tubular body 68 has a plurality of passages 70 axially between the sections with membrane potting 50, 52 (region 54 lying in between) in its tube wall (on the lateral side). The passages 70 enable the passage of gas or moist gas flow from the interior of the tubular body 68 into the interspace between the hollow fiber membranes of the membrane unit 40.

A throttle disk 72 is arranged in the tubular body 68, at which the clear internal cross section of the tubular body 68 is reduced by 50% in the example (cf. FIGS. 2, 3 and 4a). The throttle disk 72 is arranged along the axial direction 12 starting from the second inlet 20 along the axial direction 12 even before the axial center (center along the axial direction 12) of the membrane unit (40). In other words, the throttle disk 72 is not arranged centrally in the membrane unit 40 along the axial direction 12, but, starting from the center, is offset slightly towards the second inlet 20.

The end of the tubular body 68 facing away from the second inlet 20 is closed by an end wall 74 (cf. FIGS. 2 and 3). An opening 76, which is in flow connection with a further water outlet 78, is formed in the end wall 74. In the example, the end wall 74 is arranged along the axial direction 12 within the section with membrane potting 52 facing away from the second inlet 20.

The first inlet 16 and the first outlet 18 are in flow connection with each other via first flow path 1' (cf. FIG. 3). The first flow path 1' extends from the first inlet 16 along or parallel to the axial direction 12 through the membrane unit 40 and to the first outlet 18. In other words, the gas flow to be humidified (for example dry, oxygen-containing or oxygen-rich fresh air) passes the membrane unit 40 along or parallel to the axial direction 12. The gas flow (humidified by passing the membrane unit 40) leaves the humidifier 10 at the first outlet 18 (humidified fresh air). This gas flow can then be supplied, for example, to a stack of a fuel cell.

The second inlet 20 and the second outlet 22 are in flow connection with each other via the second flow path 2' (cf. FIGS. 3, 4a and 4b). The second flow path 2' extends from the second inlet 20 through the membrane unit 40 and to the second outlet 22, wherein the second flow path 2' passes into the interior of the membrane unit 40 by means of the tubular body 68 and runs from there radially outwards to the first chamber 42 and to the second chamber 44 to the second outlet 22. In other words, the gas flow to be dehumidified (for example moist, low-oxygen air) passes the membrane unit 40 to a certain extent along or parallel to the axial direction 12, wherein the gas flow within the membrane unit 40 then flows (radially) outwards (via the first chamber and the second chamber) to the second outlet 22.

The gas flow (dehumidified by passing the membrane unit 40) leaves the humidifier 10 at the second outlet 22 (dehumidified or spent air). The moist, low-oxygen air at the second inlet 20 can be supplied, for example, as spent air from a stack of a fuel cell. The dehumidified air at the second outlet 22 can be supplied to a compressor, for example.

The humidifier 10 is configured such as to operate according to the cross-flow principle. This means that the first flow path 1' and the second flow path 2' (coming from the respective inlet 16, 20) are combined, intersect and are then guided away from one another again. This differs, for example, from humidifiers operating according to the countercurrent principle, in which flow paths flow congruently or parallel to one another in opposite directions or are guided along one another.

The invention claimed is:

1. A humidifier, said humidifier comprising:
   a housing that extends along an axial direction, wherein the housing has a first inlet, a first outlet, a second inlet and a second outlet, and
   a membrane unit is arranged in the interior of the housing,
   the first inlet and the first outlet are in flow connection with each other via a first flow path,
   the second inlet and the second outlet are in flow connection with each other via a second flow path,
   the membrane unit is cylindrical and has a plurality of hollow fiber membranes arranged side by side,
   the membrane unit is outwardly surrounded at least in part by a first chamber,
   the first chamber is outwardly surrounded at least in part by a second chamber separate from the first chamber,
   the first chamber as a whole is in flow connection with the second chamber via one or more throttle slots,
   the membrane unit has a section with membrane potting at its axial ends in each case and the first chamber has a greater length along the axial direction than the second chamber,
   the first chamber extends along the membrane unit from the section with membrane potting at the first axial end to the section with membrane potting at the second axial end, and
   the first chamber forms a flow way extending axial along the membrane unit from the section with membrane potting at the first axial end to the section with membrane potting at the second axial end.

2. The humidifier according to claim 1, wherein the first chamber has a lower height along a radial direction, which is oriented orthogonally to the axial direction, than the second chamber.

3. The humidifier according to claim 1, wherein the first chamber and/or the second chamber are formed at least predominantly circumferentially along the circumferential direction of the membrane unit, are formed completely circumferentially along the circumferential direction of the membrane unit.

4. The humidifier according to claim 1, wherein a first water outlet is formed on the housing and is in flow connection with the second chamber.

5. The humidifier according to claim 1, wherein the one or more throttle slots are formed at least predominantly circumferentially along the circumferential direction and/or in that the one or more throttle slots have a different slot width along the circumferential direction.

6. The humidifier according to claim 1, wherein the second inlet is in flow connection with a tubular body which extends along or parallel to the axial direction through the membrane unit, wherein the tubular body has a plurality of passages in its tube wall, wherein a throttle disk is arranged in the tubular body, at which throttle disk the clear inner cross-section of the tubular body is reduced by at least 30%.

7. The humidifier according claim 6, wherein the throttle disk is arranged along the axial direction starting from the second inlet along the axial direction even before the axial center of the membrane unit.

8. The humidifier according to claim 7, wherein the end of the tubular body facing away from the second inlet is closed by an end wall, wherein an opening is formed in the end wall, which opening is in flow connection with a second water outlet.

9. The humidifier according to claim 1, wherein the first inlet and the second inlet are arranged in a first section of the housing and the first outlet and the second outlet are arranged in a second section of the housing.

10. The humidifier according to claim 1, wherein the second inlet is in flow connection with a tubular body which extends along or parallel to the axial direction through the membrane unit, wherein the tubular body has a plurality of passages in its tube wall, wherein a throttle disk is arranged in the tubular body, at which throttle disk the clear inner cross-section of the tubular body is reduced by at least 40%.

11. The humidifier according claim 10, wherein the throttle disk is arranged along the axial direction starting from the second inlet along the axial direction even before the axial center of the membrane unit.

12. The humidifier according to claim 11, wherein the end of the tubular body facing away from the second inlet is closed by an end wall, wherein an opening is formed in the end wall, which opening is in flow connection with a third water outlet.

13. The humidifier according to claim 1, wherein the second inlet is in flow connection with a tubular body which extends along or parallel to the axial direction through the membrane unit, wherein the tubular body has a plurality of passages in its tube wall, wherein a throttle disk is arranged in the tubular body, at which throttle disk the clear inner cross-section of the tubular body is reduced by at least 50%.

14. The humidifier according claim 13, wherein the throttle disk is arranged along the axial direction starting from the second inlet along the axial direction even before the axial center of the membrane unit.

15. The humidifier according to claim 14, wherein the end of the tubular body facing away from the second inlet is closed by an end wall, wherein an opening is formed in the end wall, which opening is in flow connection with a fourth water outlet.

\* \* \* \* \*